(12) United States Patent
Storms

(10) Patent No.: US 8,499,382 B2
(45) Date of Patent: Aug. 6, 2013

(54) COMPANION SLEEPING BAG

(76) Inventor: Andrew E. Storms, Seattle, WA (US)

(*) Notice: Subject to any disclaimer, the term of this patent is extended or adjusted under 35 U.S.C. 154(b) by 30 days.

(21) Appl. No.: 13/352,310

(22) Filed: Jan. 17, 2012

(65) Prior Publication Data

US 2012/0180213 A1 Jul. 19, 2012

Related U.S. Application Data

(60) Provisional application No. 61/461,456, filed on Jan. 18, 2011.

(51) Int. Cl.
*A47G 9/08* (2006.01)

(52) U.S. Cl.
USPC .............................................. 5/413 R; 5/417

(58) Field of Classification Search
USPC ...... 5/413 R, 417, 420; 119/482, 28.5; 2/69.5
See application file for complete search history.

(56) References Cited

U.S. PATENT DOCUMENTS

| | | | | | |
|---|---|---|---|---|---|
| 3,510,889 | A | * | 5/1970 | Peterson | 5/413 R |
| 4,183,111 | A | * | 1/1980 | Zahavkochav | 5/413 R |
| 4,989,282 | A | * | 2/1991 | Goldstein | 5/413 R |
| 5,473,779 | A | * | 12/1995 | Kramer | 5/413 R |
| 2009/0151071 | A1 | * | 6/2009 | Martin | 5/413 R |

* cited by examiner

*Primary Examiner* — Fredrick Conley
(74) *Attorney, Agent, or Firm* — Charles J. Rupnick

(57) ABSTRACT

A companion sleeping bag (A) having an enclosure (1) formed of a shell (6) having opposing folds (6A, 6B) joined together at least along a head portion (12) and forming an interior sleeping space (11) defined by an interior liner (8) therebetween. One of the opposing folds (6A, 6B) is formed with an opening (5) therethrough into the interior space (11) with a collar (2) is positioned around the opening (5). A mating means (10), such as a zipper, is coupled to the opposing folds (6A, 6B) of the shell (6) adjacent to one or both sides (15, 16) of the enclosure (1). The mating means (10) is securable between the opposing folds (6A, 6B). The mating means (10) is further matable to a cooperating mating portion (D) of a separate conventional sleeping bag (B) or another for joining the companion sleeping bag (A) thereto.

20 Claims, 4 Drawing Sheets

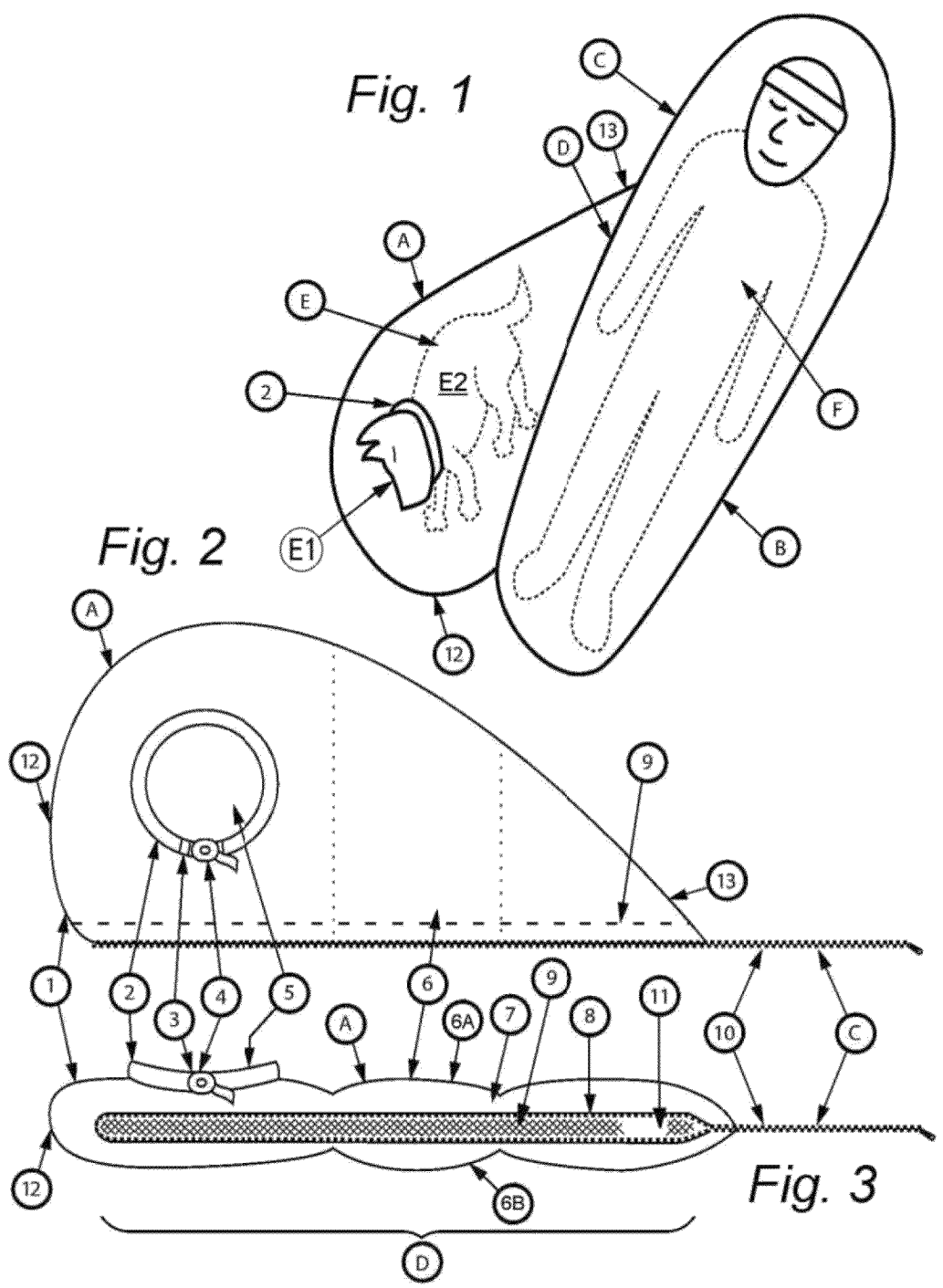

COMPANION SLEEPING BAG

This application claims priority benefit of copending parent U.S. Provisional Patent Application Ser. No. 61/461,456 filed in the name of Andrew Elles Storms, the sole inventor hereof, on Jan. 15, 2011, the complete disclosure of which is incorporated herein by reference.

FIELD OF THE INVENTION

The present invention relates generally to a companion sleeping bag for keeping a child or pet warm and dry, and in particular to companion sleeping bags for children and pets being matable to a conventional sleeping bag for a conventional occupant, such as an adult human.

BACKGROUND OF THE INVENTION

It is generally well-known that small children and pets sleeping outdoors can become cold and wet while sleeping in inclement weather.

Therefore, it is the intention of this invention to provide a warm and dry sleeping means for protecting a child or pet in inclement weather.

SUMMARY OF THE INVENTION

The present invention is a companion sleeping bag for keeping a child or pet warm and dry, and in particular to companion sleeping bags for children and pets that is matable to a conventional sleeping bag for a conventional occupant, such as an adult human.

Accordingly, the present invention is a sleeping bag either for an animal or a child, which attaches to a conventional sleeping bag for a conventional occupant, such as an adult human. The companion sleeping bag may also be used by itself, as a stand-alone product.

The companion sleeping bag may use a zipper or other mating means to connect to the conventional sleeping bag. The companion sleeping bag may also mate with another of the same companion sleeping bags.

The companion sleeping bag permits a conventional occupant, such as an adult human, to share heat with the animal or child. The companion sleeping bag may be insulated.

The companion sleeping bag also may restrain the animal or child to secure them therein.

To this end, the companion sleeping bag may have a clasp and/or adjuster. The companion sleeping bag may have a divider between the conventional sleeping bag and the companion sleeping bag.

According to one embodiment, the companion sleeping bag may have a zipper or other mating means positioned on opposites sides to connect to another companion sleeping bag on the other side, or between two of the conventional sleeping bags.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a pictorial view that illustrates a companion sleeping bag for keeping a small companion, such as a child or pet, warm and dry, wherein the companion sleeping bag is matable to a conventional sleeping bag;

FIG. 2 is a top elevation of the companion sleeping bag illustrated in FIG. 1, and illustrates mating thereof with the conventional sleeping bag illustrated therein;

FIG. 3 is a side elevation of the companion sleeping bag illustrated in FIG. 1, and illustrates mating thereof with the conventional sleeping bag illustrated therein;

FIG. 6 and FIG. 7 are detailed view of the companion sleeping bag of FIG. 4, wherein FIG. 6 is a top elevation view of the companion sleeping bag, and FIG. 7 is a side elevation view thereof.

DETAILED DESCRIPTION OF PREFERRED EMBODIMENT

Figure 4:
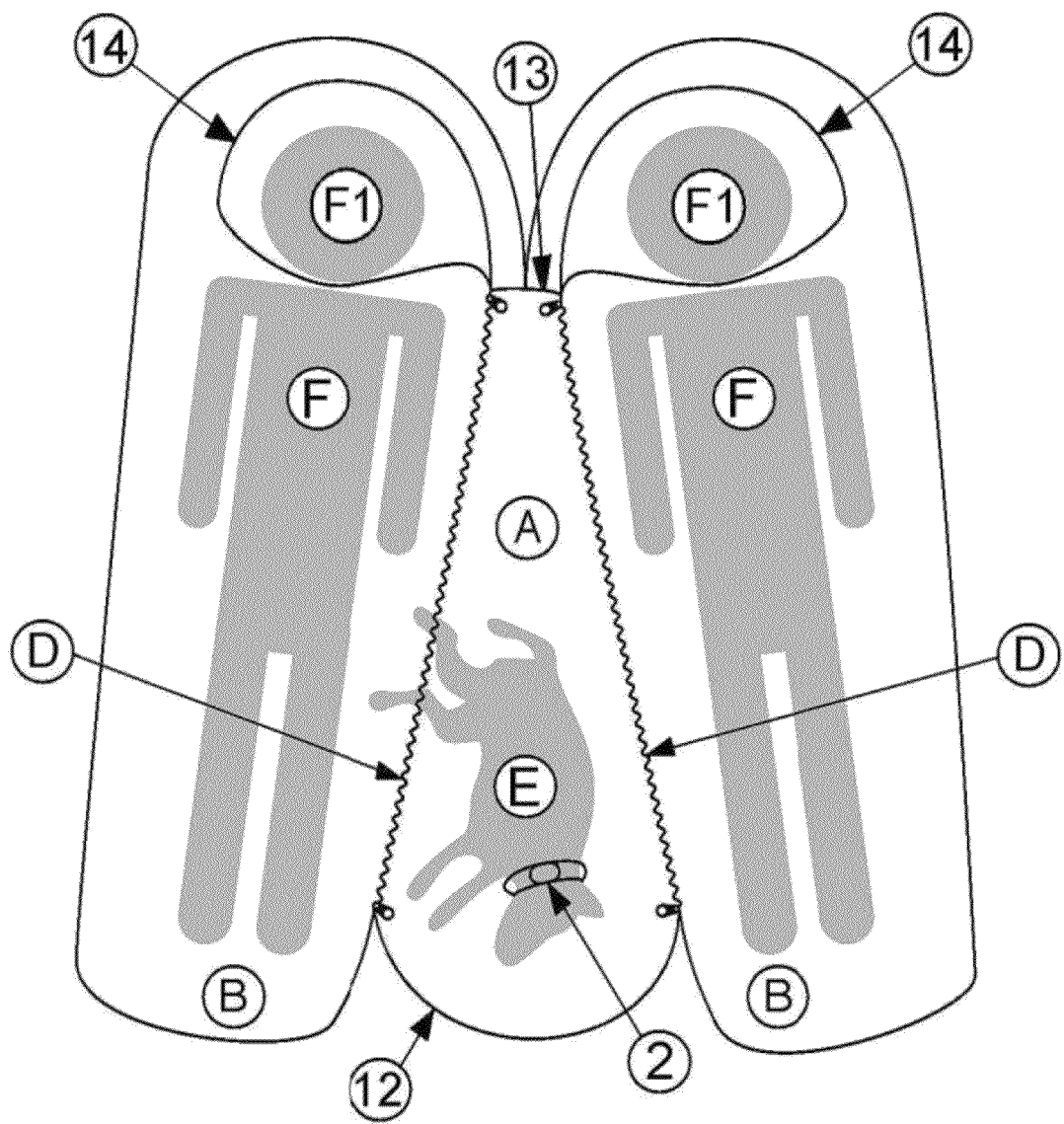
FIG. 4 is a pictorial view that illustrates the companion sleeping bag being mated to a pair of the conventional sleeping bags.

In the Figures, like numerals indicate like elements.

FIG. 1 is a pictorial view that illustrates a companion sleeping bag (A) for keeping a small child or pet companion (E) warm and dry, wherein the companion sleeping bag (A) is matable to a conventional sleeping bag (B) of a type for a conventional occupant (F), such as an adult human. The conventional sleeping bag (B) has a conventional zipper closure (C). The companion sleeping bag (A) is positioned close beside the upright conventional sleeping bag (B) in a substantially inverted orientation relative thereto. The companion sleeping bag (A) attaches to the conventional sleeping bag (B) by means of a cooperating mating portion (D) thereof, or the companion sleeping bag (A) may be used by itself, as a stand-alone product independently of the conventional sleeping bag (B).

FIG. 2 is a top elevation of the companion sleeping bag (A), and FIG. 3 is a side elevation of the companion sleeping bag (A), and mating thereof with the conventional sleeping bag (B). The companion sleeping bag (A) is formed as an enclosure (1) formed of an outer shell (6) having opposing folds (6A and 6B) joined along a head portion (12) of the enclosure (1). For example, the shell (6) is either continuous along the head portion (12) between opposing folds (6A, 6B), or the opposing folds (6A, 6B) are joined together along the head portion (12). One of the opposing folds (6A, 6B) is formed with a head opening (5) through the shell (6), for example, near the head portion (12). The opening (5) is sized to accommodate the companion's head (E1), while the remainder of the companion's body (E2) is protected within an interior sleeping space (11) of the companion sleeping bag (A) between the opposing folds (6A, 6B) of the shell (6). A foot portion (13) of the enclosure (1) opposite from the head portion (12) is optionally either open or closed.

The companion sleeping bag (A) permits a conventional occupant (F), such as an adult human, to share heat with the companion animal or child (E). The companion sleeping bag (A) may utilize a mating means (10), such as a zipper or other mating means, to connect to the conventional sleeping bag (B) along the mating portion (D) thereof. For example, when the mating means (10) is a zipper is zipped with a zipper of the conventional sleeping bag (B). Velcro® or other mating means (10) is operated appropriately to similarly join the companion sleeping bag (A) to the conventional sleeping bag (B). The companion sleeping bag (A) may also mate with another of the same companion sleeping bag (A) by mating the respective mating means (10) of the two companion sleeping bags (A). The mating means (10) is positioned adjacent to each of opposing folds (6A, 6B) of the shell (6) and extended therealong. Accordingly, the mating means (10) is operable for securing the opposing folds (6A, 6B) together for closing the companion sleeping bag (A) when not attached to a conventional sleeping bag (B) or another of the same companion sleeping bag (A). For example, when the mating means (10) is a zipper, the zipper is zipped closed. Velcro® or other mating means (10) is operated appropriately to similarly join the opposing folds (6A, 6B) of the shell (6).

The companion sleeping bag (A) is optionally insulated with insulation (7) between the shell (6) and an interior liner (8). For example, the insulation (7) is down, or insulating batting.

The companion sleeping bag (A) also may restrain the companion animal or child (E) to secure them therein. To this end, the companion sleeping bag (A) may have a collar (2) positioned around the opening (5) through the shell (6) thereof that fits around the neck of the companion (E), while the companion's head (E1) is extended therethrough. The collar (2) is optionally fitted with a buckle, Velcro strap, or other clasp (4) for securing the opening (5), and the collar (2) may also have an adjuster (3) for changing the size of the opening (5). Alternatively, the collar (2) of the companion sleeping bag (A) may have the adjuster (3) for changing the size of the opening (5) without the clasp (4) for securing the companion.

The companion sleeping bag (A) may have a divider (9) that divides between the conventional sleeping bag (B) and the interior space (11) of the companion sleeping bag (A). When the optional divider (9) is in place, access to the companion sleeping bag (A) is through the opening (5). The optional divider (9), when present, thus protects the conventional occupant (F) of the conventional sleeping bag (B) from accidental kicking or scratching by the sleeping child or pet companion (E) occupying the companion sleeping bag (A). For example, the divider (9) is a sheet of material coupled between the opposing folds (6A, 6B) of the shell (6) and extended therebetween. Optionally, the divider (9) is an extension of the interior liner (8), or is any of a breathable mesh material, a rip-stop nylon fabric, a canvas, or another suitable fabric material attached, as by sewing, to the opposing folds (6A, 6B) of the shell (6).

FIG. 4 illustrates the companion sleeping bag (A) being adapted for being matable to two of the conventional sleeping bags (B) of the type for conventional occupants (F) by means of the respective cooperating mating portions (D) thereof. The two conventional sleeping bags (B) are positioned side-by-side in similar upright orientation, and spaced apart with their respective mating portions (D) facing inward toward one another. The companion sleeping bag (A) is positioned between the two conventional sleeping bags (B) in the relatively inverted orientation.

Optionally, the companion sleeping bag (A) is formed in a wedge shape having the wider head portion (12) having the opening (5) that fits around the neck of the companion (E), and tapering to the narrower foot portion (13). The narrower foot (13) is positioned adjacent to head portions (14) of the conventional sleeping bags (B). Accordingly, the two upright conventional sleeping bags (B) form in a general "A" shape with the companion sleeping bag (A) inverted therebetween.

Figure 5:
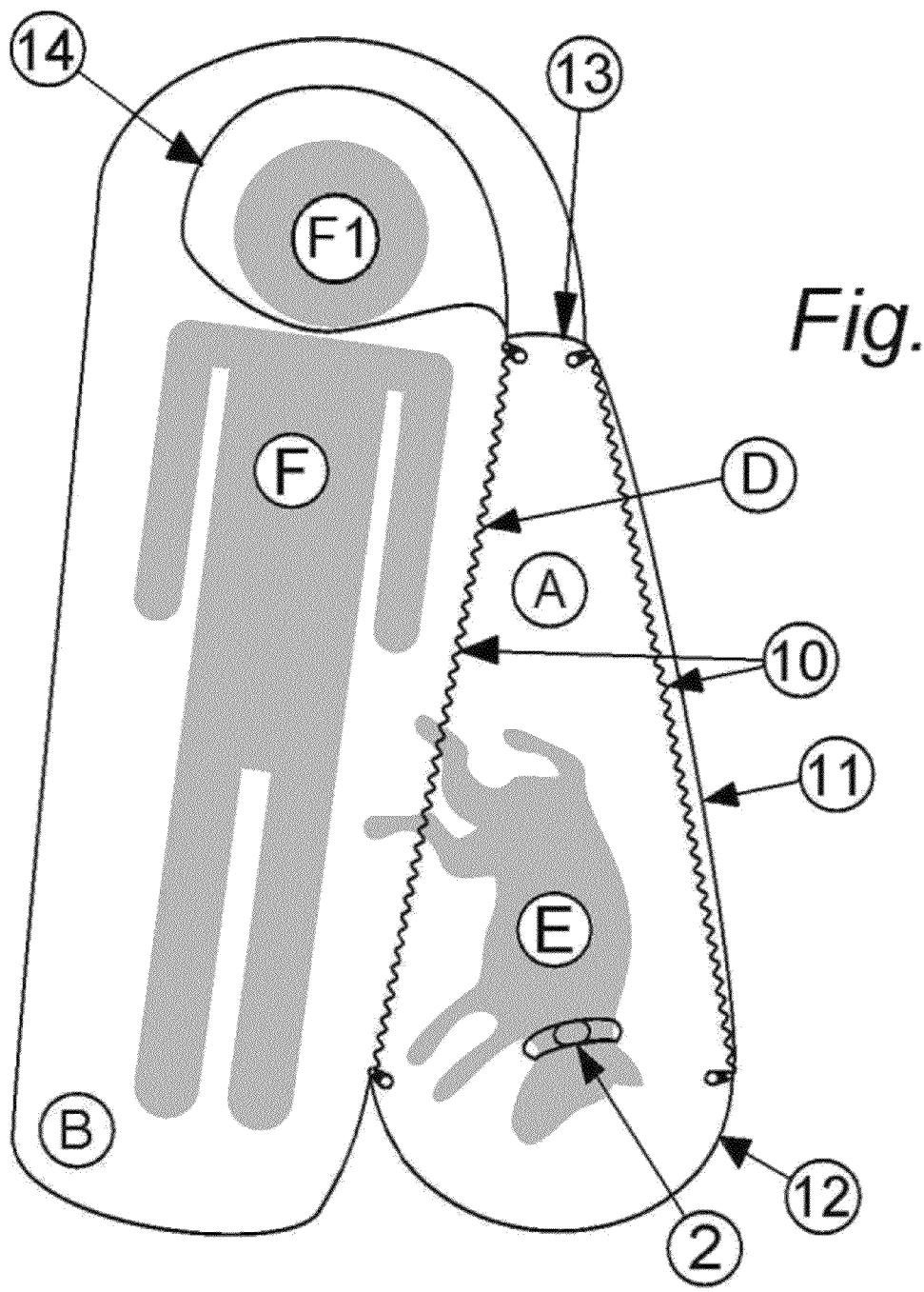
FIG. 5 is a pictorial view that illustrates the companion sleeping bag of FIG. 4 that is matable to a pair of the conventional sleeping bags, but is mated to only one conventional sleeping bag.

FIG. 5 illustrates the companion sleeping bag (A) of FIG. 4 that is adapted for being matable to two of the conventional sleeping bags (B) of the type for conventional occupants (F). Here, the companion sleeping bag (A) is formed with two of the zippers or other mating means (10) at opposite sides of the enclosure (1) and extended substantially between the head portion (12) and the foot portion (13). The companion sleeping bag (A) may be mated with two of the conventional sleeping bags (B), as shown for example in FIG. 4, with one of the conventional sleeping bags (B) being mated with each of the zippers or other mating means (10).

Else, as illustrated here, the companion sleeping bag (A) may be mated with only one conventional sleeping bag (B), and the second mating means (10) may be secured to close the companion sleeping bag (A).

Figures 6, 7:
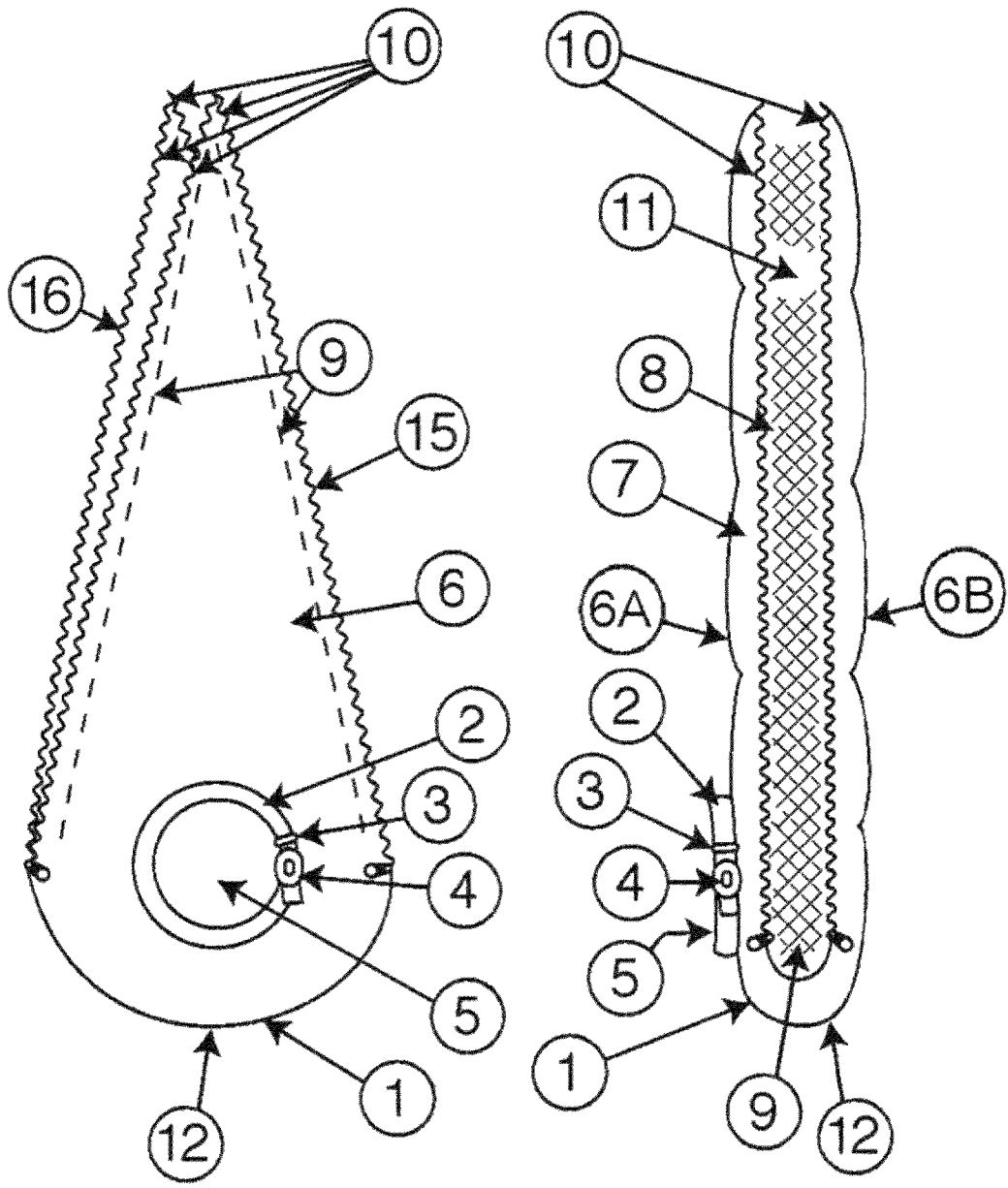

FIG. 6 is a top elevation view of the free-standing companion sleeping bag (A) of FIG. 4, and FIG. 7 is a side elevation view thereof. Similarly to the companion sleeping bag (A) of FIGS. 1-3 having a single mating means (10), here, the companion sleeping bag (A) is formed as an enclosure (1) with an opening (5) through the shell (6) thereof for the companion's head (E1), while the remainder of the companion's body (E2) is within the bag interior space (11). Here, the companion sleeping bag (A) is optionally insulated with insulation (7) between the shell (6) and the interior liner (8). The companion sleeping bag (A) may have a collar (2) positioned around the opening (5) through the shell (6) thereof that fits around the neck of the companion (E) for securely restraining the companion animal or child (E) therein. The collar (2) may be optionally fitted with the adjuster (3) and a buckle, Velcro strap, or other clasp (4) for securing the companion, or the collar (2) may have only the adjuster (3) without the clasp (4).

Here, the companion sleeping bag (A) is formed with two of the zippers or other mating means (10) at opposite sides (15 and 16) thereof between the head portion (12) and the foot portion (13). Each mating means (10) is structured for being both: (a) mated to the mating portion (D) of one of the conventional sleeping bags (B), and (b) secured to close the companion sleeping bag (A) in the absence of the conventional sleeping bag (B). For example, the two mating means (10) are zippers that can either zip to mating portion (D) of one of the conventional sleeping bags (B), or zip to itself.

The companion sleeping bag (A) may have two of the dividers (9) that divides between each of the conventional sleeping bags (B) and the interior space (11) of the companion sleeping bag (A). The dividers (9) are positioned at opposite sides (15, 16) of the bag enclosure (1) adjacent to the two mating means (10) for substantially bounding the interior space (11) available to the companion (E) to secure them therein. When either of the optional dividers (9) is in place, access to the respective companion sleeping bag (A) is through the opening (5).

While the preferred and additional alternative embodiments of the invention have been illustrated and described, it will be appreciated that various changes can be made therein without departing from the spirit and scope of the invention.

What is claimed is:

1. A companion sleeping bag, comprising:
   an enclosure (1) formed of a shell (6) comprising opposing folds (6A, 6B) joined together at least along a head portion (12) and forming an interior space (11) therebetween, and having an opening (5) formed through one of the opposing folds (6A, 6B) and positioned therewithin;
   a collar (2) positioned around the opening (5) of the shell (6);
   an interior liner (8) joined to the shell (6) between the opposing folds (6A, 6B);
   a mating means (10) coupled to the opposing folds (6A, 6B) and securable therebetween; and
   wherein the mating means (10) is further matable to a separate sleeping bag (A, B) with the opening (5) of the shell (6) positioned opposite from a head portion (14) of the separate sleeping bag (A, B).

2. The companion sleeping bag of claim 1, wherein the opening (5) formed through one of the opposing folds (6A, 6B) is further positioned adjacent to the head portion (12) of the enclosure (1).

3. The companion sleeping bag of claim 1, further comprising a collar (2) positioned around the opening (5).

4. The companion sleeping bag of claim 1, wherein the collar (2) around the opening (5) further comprises an adjuster (3) for adjusting the opening (5).

5. The companion sleeping bag of claim 4, wherein the collar (2) around the opening (5) further comprises a clasp (4) for securing the opening (5).

6. The companion sleeping bag of claim 1, further comprising a divider (9) positioned between the opposing folds (6A, 6B) of the shell (6) adjacent to the mating means (10).

7. The companion sleeping bag of claim 1, further comprising insulation (7) between the shell (6) and an interior liner (8) of the enclosure (1).

8. The companion sleeping bag of claim 1, wherein the enclosure (1) further comprises a foot portion (13) opposite from the head portion (12), the foot portion (13) being relatively narrower than the head portion (12).

9. The companion sleeping bag of claim 1, further comprising two of the mating means (10) coupled to the opposing folds (6A, 6B) and securable therebetween, the two mating means (10) being positioned adjacent to opposite sides (15, 16) of the enclosure (1) and extended at least partially between the head portion (12) and the foot portion (13).

10. A companion sleeping bag, comprising:
an enclosure (1) formed of a shell (6) comprising opposing folds (6A, 6B) joined together at least along a head portion (12) and forming an interior sleeping space (11) therebetween, and one of the opposing folds (6A, 6B) further comprising an opening (5) spaced away from an edge thereof and formed therethrough into the interior space (11);
a collar (2) positioned around the opening (5) of the shell (6) and further comprising an adjuster (3) for adjusting a size of the opening (5);
an interior liner (8) joined to the shell (6) between the opposing folds (6A, 6B) and substantially defining the interior sleeping space (11);
a mating means (10) coupled to the opposing folds (6A, 6B) adjacent to one side (15) of the enclosure (1), the mating means (10) being securable between the opposing folds (6A, 6B); and
wherein the mating means (10) is further matable to a cooperating mating portion (D) of a separate sleeping bag (A, B) with the opening (5) of the shell (6) positioned opposite from a head portion (14) of the separate sleeping bag (A, B).

11. The companion sleeping bag of claim 10, further comprising a divider (9) positioned between the opposing folds (6A, 6B) of the shell (6) adjacent to the mating means (10).

12. The companion sleeping bag of claim 11, wherein the opening (5) formed through one of the opposing folds (6A, 6B) is further positioned adjacent to the head portion (12) of the enclosure (1).

13. The companion sleeping bag of claim 11, wherein the enclosure (1) further comprises a foot portion (13) opposite from the head portion (12), the foot portion (13) being relatively narrower than the head portion (12), and the enclosure (1) further tapering from the head portion (12) toward the foot portion (13).

14. The companion sleeping bag of claim 10, further comprising an other mating means (10) coupled to the opposing folds (6A, 6B) adjacent to an opposite side (16) of the enclosure (1) opposite from the side (15) thereof, the other mating means (10) being securable between the opposing folds (6A, 6B).

15. The companion sleeping bag of claim 14, further comprising a divider (9) positioned between the opposing folds (6A, 6B) of the shell (6) adjacent to each of the mating means (10).

16. A companion sleeping bag, comprising:
an enclosure (1) formed of an outer shell (6) comprising opposing folds (6A, 6B) joined together at least along a head portion (12) and forming an interior sleeping space (11) therebetween, and one of the opposing folds (6A, 6B) further comprising a head opening (5) formed entirely within one of the opposing folds (6A, 6B) into the interior space (11);
a collar (2) positioned around the opening (5) of the shell (6) and further comprising an adjuster (3) for adjusting a size of the opening (5);
an interior liner (8) joined to the shell (6) between the opposing folds (6A, 6B) and substantially defining the interior sleeping space (11);
insulation (7) positioned between the shell (6) and the interior liner (8);
a first mating means (10) coupled to the opposing folds (6A, 6B) adjacent to a first side (15) of the enclosure (1), the mating means (10) being securable between the opposing folds (6A, 6B); and
wherein the mating means (10) is further matable to a cooperating mating portion (D) of a separate sleeping bag (A, B), the enclosure (1) being oriented oppositely from the separate sleeping bag (A, B) with the opening (5) of the shell (6) positioned oppositely from a head portion (14) of the separate sleeping bag (A, B).

17. The companion sleeping bag of claim 16, further comprising a divider (9) extended between the opposing folds (6A, 6B) of the shell (6) adjacent to the mating means (10).

18. The companion sleeping bag of claim 17, wherein the collar (2) around the opening (5) further comprises a clasp (4) for securing the opening (5).

19. The companion sleeping bag of claim 17, further comprising a second mating means (10) coupled to the opposing folds (6A, 6B) adjacent to a second side (16) of the enclosure (1) opposite from the first side (15) thereof, the second mating means (10) being securable between the opposing folds (6A, 6B) and being further matable to a cooperating mating portion (D) of an other separate sleeping bag (A, B).

20. The companion sleeping bag of claim 19, further comprising a divider (9) positioned between the opposing folds (6A, 6B) of the shell (6) adjacent to the second mating means (10).

* * * * *